United States Patent [19]
Bateman et al.

[11] Patent Number: 5,220,322
[45] Date of Patent: Jun. 15, 1993

[54] GROUND PROXIMITY WARNING SYSTEM FOR USE WITH AIRCRAFT HAVING EGRADED PERFORMANCE

[75] Inventors: Charles D. Bateman, Bellevue; J. H. Glover, Kirkland; Hans R. Muller, Redmond, all of Wash.

[73] Assignee: Sundstrand Corporation, Rockford, Ill.

[21] Appl. No.: 770,423

[22] Filed: Aug. 29, 1985

Related U.S. Application Data

[63] Continuation-in-part of Ser. No. 632,131, Jul. 18, 1984, abandoned.

[51] Int. Cl.⁵ .............................................. G08B 23/00
[52] U.S. Cl. .................................... 340/970; 340/967; 340/968; 364/433
[58] Field of Search ............... 340/959, 963, 966, 967, 340/968-970, 973, 977; 73/178 R, 178 T; 244/181; 343/5 LS, 7 TA; 364/427, 428, 433, 434; 342/65

[56] References Cited

U.S. PATENT DOCUMENTS

| | | | |
|---|---|---|---|
| 3,586,268 | 6/1971 | Melvin | 244/181 |
| 3,686,626 | 8/1972 | Bateman et al. | 364/428 |
| 3,715,718 | 2/1973 | Astengo | 340/970 |
| 3,743,221 | 7/1973 | Lykken et al. | 364/433 |
| 3,890,614 | 6/1975 | Argentieri et al. | 340/977 |
| 3,916,688 | 11/1975 | Dendy et al. | 364/428 |
| 3,946,358 | 3/1976 | Bateman | 340/970 |
| 3,947,809 | 3/1976 | Bateman | 340/970 |
| 3,947,810 | 3/1976 | Bateman et al. | 364/427 |
| 4,030,065 | 6/1977 | Bateman | 340/970 |
| 4,043,194 | 8/1977 | Tanner | 340/968 |
| 4,060,793 | 11/1977 | Bateman | 340/970 |
| 4,079,905 | 3/1978 | Greene | 73/178 R |
| 4,189,777 | 2/1980 | Kuntman | 340/970 |
| 4,229,725 | 10/1980 | Reilly | 340/968 |
| 4,230,290 | 10/1980 | Townsend et al. | 340/967 |
| 4,281,383 | 7/1981 | Lebrun | 364/428 |
| 4,319,218 | 3/1982 | Bateman | 73/178 T |
| 4,330,827 | 5/1982 | Kettler | 364/428 |
| 4,347,572 | 8/1982 | Berwick, Jr. et al. | 364/433 |
| 4,433,323 | 2/1984 | Grove | 340/970 |

Primary Examiner—Jin F. Ng
Assistant Examiner—Brent A. Swarthout
Attorney, Agent, or Firm—Fitch, Even, Tabin & Flannery

[57] ABSTRACT

Performance of an aircraft ground proximity warning system can be improved, especially where the performance of the aircraft itself has been degraded by a factor such as wind shear, by extending Mode 1 and Mode 3 warning envelopes down to within five feet of the ground. Additional improvements in warnings can be made by monitoring flight path angle, stall margin, angle of attack and deceleration profile, when the aircraft is close to the ground.

14 Claims, 7 Drawing Sheets

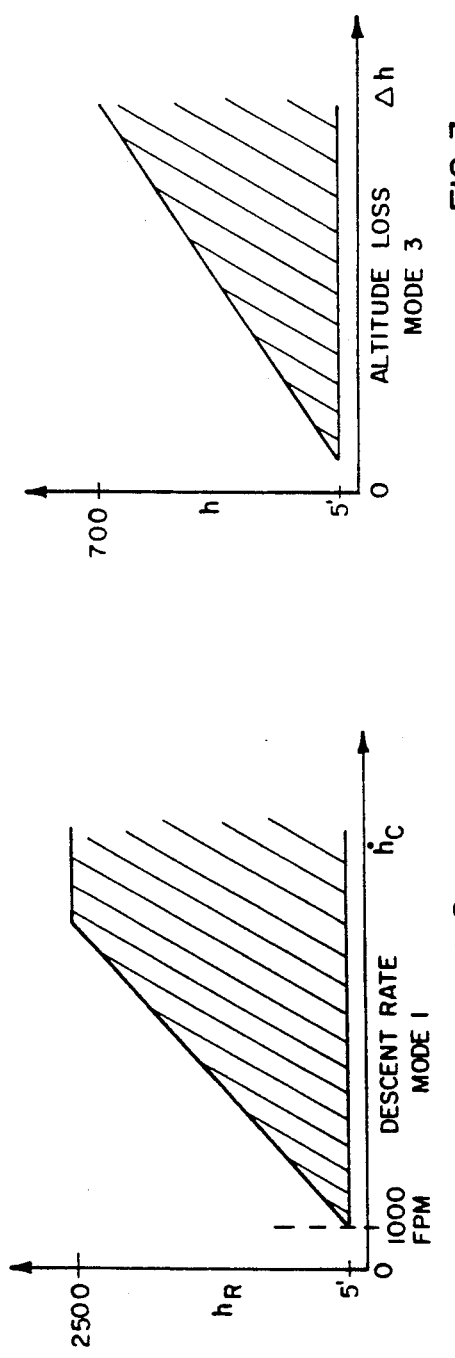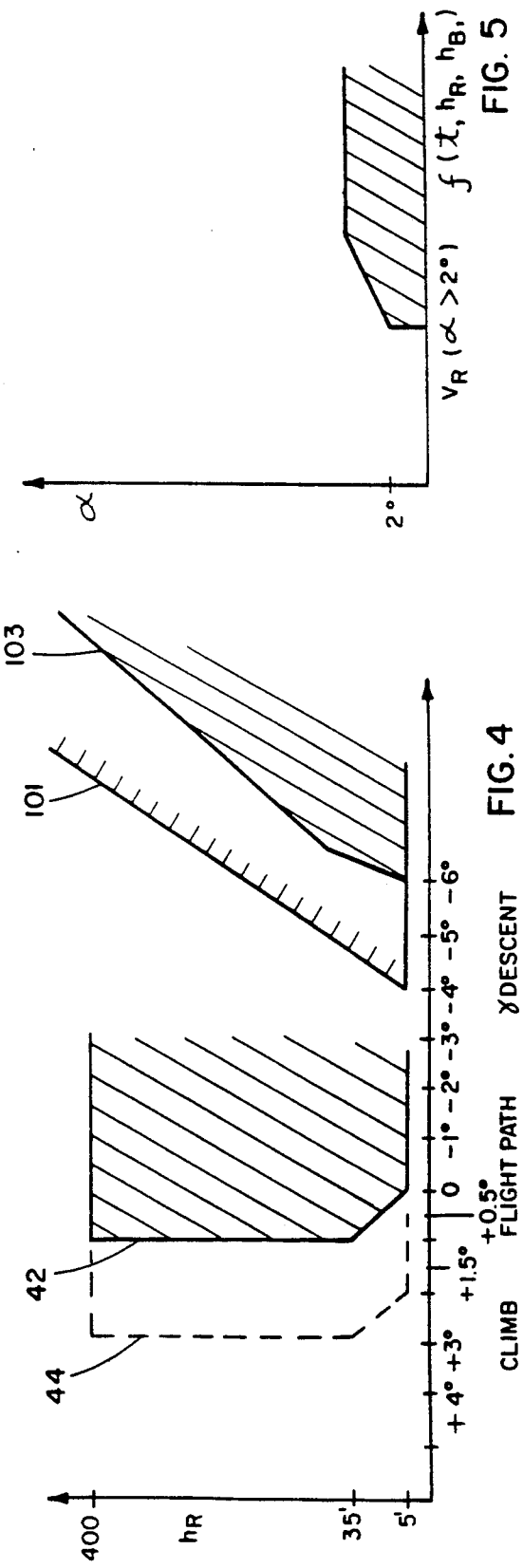

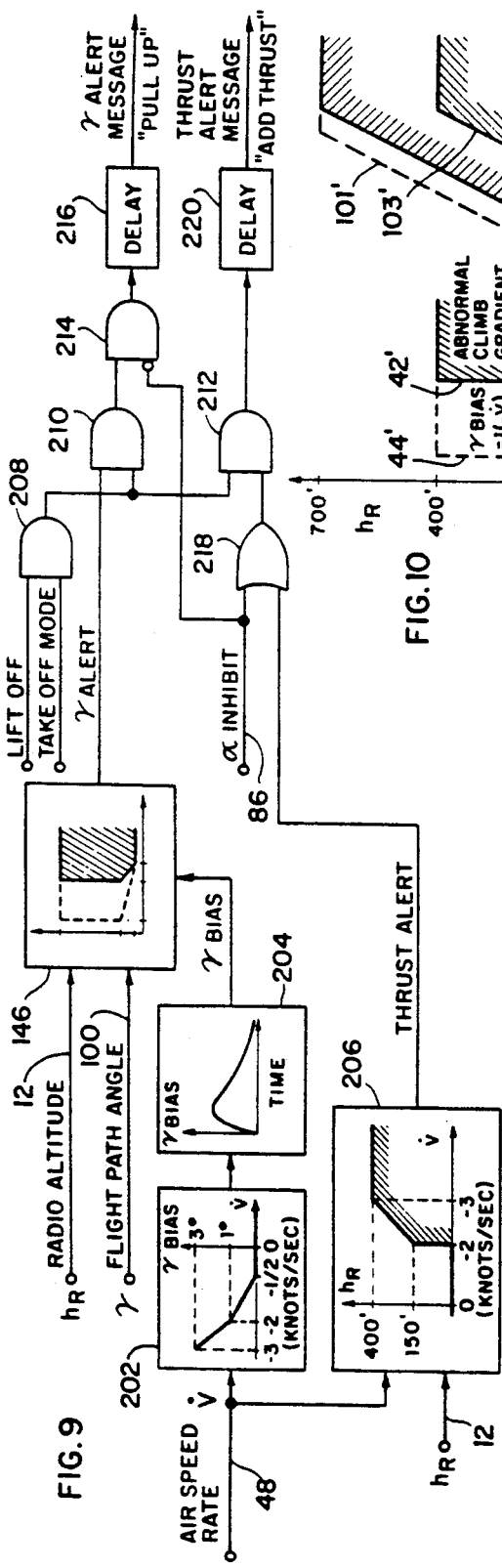
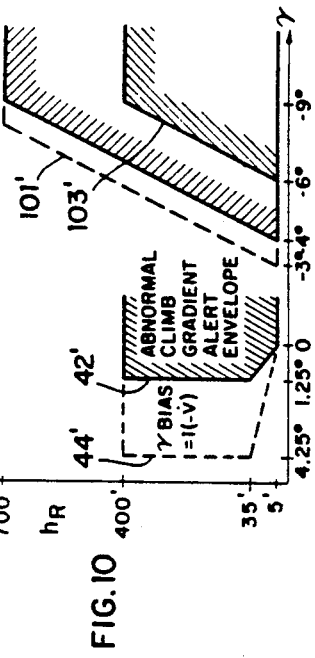
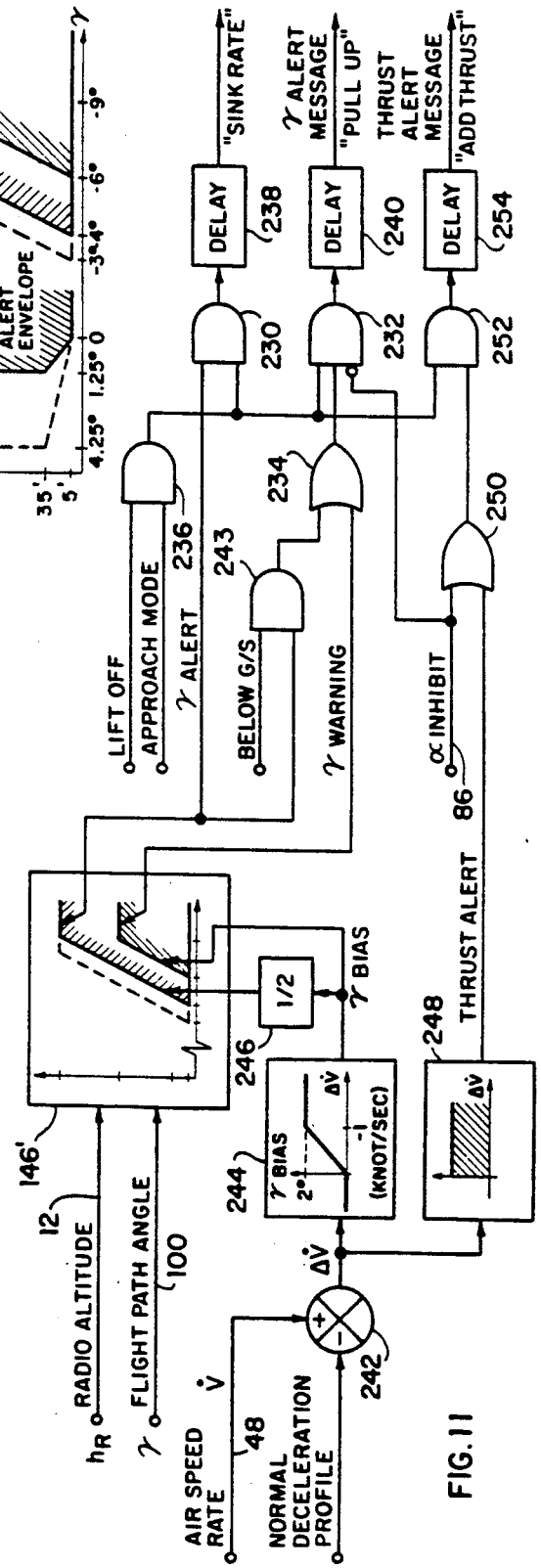
FIG. 9
FIG. 10
FIG. 11

GROUND PROXIMITY WARNING SYSTEM FOR USE WITH AIRCRAFT HAVING EGRADED PERFORMANCE

CROSS-REFERENCE

This application is a continuation-in-part of application Ser. No. 06/632,131, filed on Jul. 18, 1984, now abandoned.

TECHNICAL FIELD

This invention relates to the field of aircraft ground proximity warning systems and, in particular, to systems that provide enhanced warnings in the event of degraded aircraft performance near the ground.

BACKGROUND OF THE INVENTION

Ground proximity warning systems that provide warnings of potential impact with the ground under controlled flight conditions have been developed over the past fifteen years. Examples of such systems are disclosed in U.S. Pat. Nos. 3,946,751; 3,947,810; 4,060,793; 4,319,218 and 4,433,323. One of the objects of the ground proximity warning systems illustrated in the above patents is to utilize sensors that are normally present in commercial aircraft, such as the radio altimeter, barometric altimeter and glide slope receiver to provide the aircrew with timely warnings of an impending but inadvertent contact with the ground. These systems have generally proved to be highly effective in preventing controlled flight into terrain type accidents.

However, there are flight situations where the performance of the aircraft itself becomes degraded and in certain of these situations existing ground proximity warning systems may not provide as timely a warning as might be desired. Reasons for degraded aircraft performance are many and varied and as such include: wind shear, etc.; improper configuration including gear down, partial spoilers, flaps, etc.; degraded lift from rain, ice, excess weight, improper flap settings, etc.; insufficient engine thrust; and instrument errors leading to inappropriate changes in thrust, attitude or airspeed. When reviewed with respect to past aircraft accidents involving degraded performance neither existing ground proximity warning Mode 1 which is the excessive descent rate warning mode described in U.S. Pat. No. 4,060,793 nor Mode 3 which is the negative climb after take-off warning mode described in U.S. Pat. No. 4,319,218 would always provide as much warning as might be desired For example, in certain wind shear situations the warning generated by existing Modes 1 and 3 may not be timely enough to be useful.

In addition to giving timely alerts it is also highly desirable to give the aircrew an indication as to what should be done to recover from a dangerous situation especially under unusual circumstances such as wind shear or misleading instrument readings. For instance, there have been situations where an aircraft has struck the ground which could have been avoided if the aircrew had appreciated that the aircraft had additional performance immediately available in terms of airspeed that could have been converted to altitude or that additional thrust could have been applied.

With respect to degraded performance due to wind shear, there have been a number of proposed systems, as described, for example, in U.S. Pat. Nos. 4,043,194; 4,079,905; 4,229,725; 4,281,383; 4,342,912 and 4,336,606, for alerting an aircrew to a wind shear condition. However, such systems are often difficult to implement or require additional sensors or do not provide usable information in a timely manner.

In one approach described in U.S. Pat. No. 4,189,777, airspeed rate is used to detect a wind shear condition and in response thereto a ground proximity warning system Mode 1 warning curve is modified to increase warning time. Another approach relating to wind shear conditions is described in U.S. Pat. No. 4,347,572 in which angle of attack, stick shaker value, vertical speed, airpseed, flap position, and thrust are used to provide climb out guidance on a pilot flight director display in a wind shear situation.

None of the systems described above provide enhanced ground proximity warning or guidance for a comprehensive set of degraded aircraft performance situations.

SUMMARY OF THE INVENTION

It is therefore an object of the invention to provide an aircraft ground proximity warning system with enhanced warning capability when aircraft performance is degraded.

It is a further object of the invention to provide an aircraft ground proximity warning system with enhanced warning capability near the ground. Specifically the warning envelope of Modes 1 and 3 are extended to within five feet of the ground. Radio altitude rate and barometric altitude rate signals are combined to provide a computed altitude rate signal that is accurate near the ground for use as an input to Modes 1 and 3.

It is an additional object of the invention to provide an aircraft ground proximity warning system with flight path deviation warning utilizing a measure of flight path and aircraft altitude. The measure of flight path can be based on aircraft vertical velocity. A flight path warning is provided whenever the aircraft flight path angle is less than a predetermined angle and when the aircraft is below a predetermined altitude.

It is still a further object of the invention to provide a pitch warning system for generating a warning when aircraft pitch is below a predetermined value after rotation. The pitch warning system can utilize angle of attack for pitch measurement.

It is another object of the invention to provide an aircraft ground proximity warning system with an output indicating that additional aircraft performance is available. Angle of attack is compared to stall angle of attack to generate an indication that angle of attack should be increased. A pilot indication to apply additional thrust can also be provided.

BRIEF DESCRIPTION OF THE DRAWINGS

FIG. 2 is a graphical representation of a Mode 1 warning envelope;

FIG. 3 is a graphical representation of a Mode 3 warning envelope;

FIG. 4 is a graphical representation of a flight path warning envelope;

FIG. 5 is a graphical representation of a takeoff angle of attack warning evelope;

FIG. 9 is a functional block diagram of another embodiment of the flight path logic used during take-off;

FIG. 10 is a graphical representation of an alternative flight path warning envelope;

FIG. 11 is a functional block diagram of an alternative embodiment of the flight path warning logic used during approach;

DETAILED DESCRIPTION OF THE INVENTION

Figure 1:
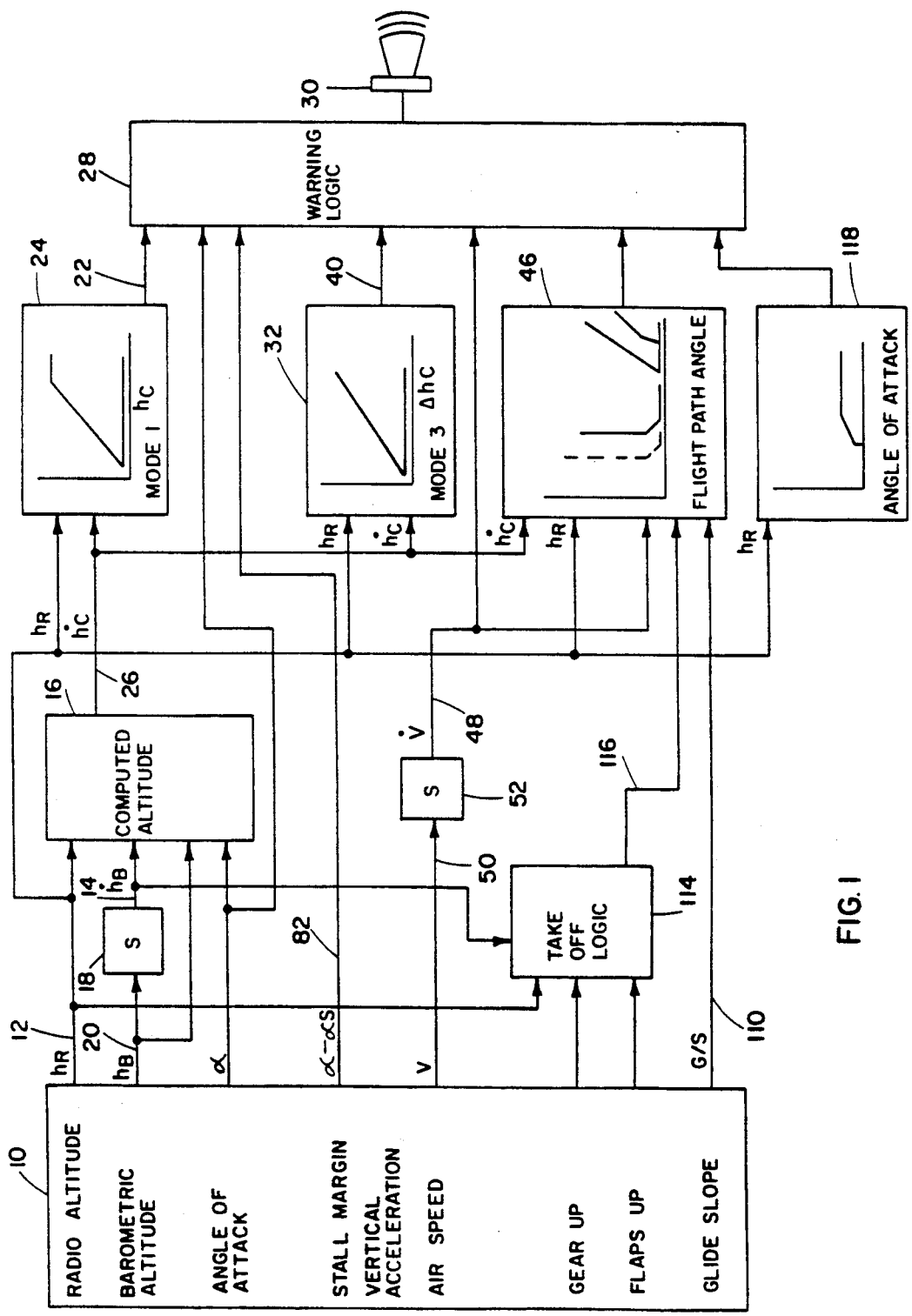
FIG. 1 is a functional block diagram of a ground proximity warning system with angle of attack and stall warning margin inputs.

FIG. 1 illustrates in generalized block diagram form the preferred embodiment of the invention. A source of signals or data source for the warning system is indicated by a block 10. The signals provided by the data source 10 include: radio altitude $h_R$, barometric altitude $h_B$, angle of attack $\alpha$, stall margin $\alpha - \alpha s$, vertical acceleration $a_n$, airspeed V, gear and flap position and glide slope G/S. Typically in modern digital commercial aircraft these signals are available from the aircraft digital data bus or flight management system. On older aircraft, these signals are normally available from individual instruments.

As shown in FIG. 1 the warning system has four separate warning modes. These modes include a Mode 1 excessive descent rate warning mode, a Mode 3 negative climb after take-off warning mode, a flight path warning mode and a take-off angle of attack warning mode. Although only four warning modes are described, it will be understood that the system could include other warning modes such as those disclosed in U.S. Pat. No. 3,946,358.

A graphical representation of an improved Mode 1 warning envelope is provided in FIG. 2. This warning envelope is similar to that shown in U.S. Pat. No. 4,060,793 with the primary exception that the radio altitude cut off has been moved down to five feet of radio altitude as opposed to 50 feet in the prior art system. By lowering the warning boundary to five feet, warnings can be generated much closer to the ground which can be useful in, for example, wind shear situations on an approach to landing. Lowering the floor of Mode 1 is made possible by producing a computed altitude rate signal $h_C$ which overcomes error sources in the barometric rate signal close to the ground.

As shown in FIG. 1 the Mode 1 warning envelope of FIG. 2 is produced by applying the radio altitude signal $h_R$ on line 12 and a barometric rate signal $h_B$ on line 14 to a computed altitude circuit 16. The barometric rate signal is obtained from a differentiating circuit 18 which receives a barometric altitude signal $h_B$ from signal source 10 over line 20. Alternatively, the Z-velocity or vertical velocity signal from an inertial navigation system may be used instead of the barometric rate signal. The computed altitude circuit 16 which will be described in detail in connection with FIG. 6 differentiates the radio altitude signal $h_R$ to obtain a radio altitude rate signal, and combines the radio altitude rate signal $h_R$ with the barometric altitude rate signal to produce the computed altitude rate signal $h_C$. This signal includes proportionally more radio altitude rate the closer the aircraft is to the ground thereby tending to eliminate error sources in the barometric rate signals due to ground effects. Mode 1 warning initiation signals are produced on a line 22 by a warning circuit 24 which receives the computed altitude rate signal over line 26 and the radio altitude signal on line 12. Suitable means for implementing the operation of circuit 24 is disclosed in U.S. Pat. No. 4,060,793, which is herein incorporated by reference. A warning logic circuit 28 receives the Mode 1 initiated signal on line 22 and generates, where appropriate, a voice warning on a cockpit speaker 30.

In a similar manner the effectiveness of Mode 3 is enhanced by reducing the radio altitude cut-off from 50 feet to 5 feet as illustrated by the warning envelope of FIG. 3. A warning mode logic circuit 32 receives the radio altitude signal over line 12 and the computed altitude rate signal $h_C$ over line 26 from the computed altitude rate circuit 16. It is the accuracy of the computed altitude rate signal that permits the Mode 3 warning of FIG. 3 to be reduced to five feet of radio altitude and hence resulting in a more responsive warning system. The logic circuit 32 operates in a conventional manner such as the systems disclosed in U.S. Pat. Nos. 3,947,810 or 4,319,218 hereby incorporated by reference to produce warning initiate signals on line 40 when the aircraft descends a predetermined amount of altitude after take off.

Accident analysis has shown that flight safety can also be improved by giving a warning for inadequate flight path angle $\gamma$ when the aircraft is close to the ground either during take off or a landing approach. An illustration of the preferred embodiment of a flight path warning envelope for the takeoff phase of flight is provided in FIG. 4. Here the cross-hatched portion to the right of line 42 indicates that a flight path warning will be initiated for flight path angles less than 1.0° for radio altitudes of 35 feet or greater.

Wind shear can cause a sustained loss of airspeed. With a loss of airspeed a loss of altitude may follow and as such it is desired that the aircraft be in a climb attitude in order to prevent or minimize any dangerous loss of altitude near the ground. Therefore, under conditions of a negative airspeed rate, the warning curve of FIG. 4 is shifted to the left as indicated by the dashed line 44 so that a warning is given earlier at a greater flight path angle.

Figure 6:
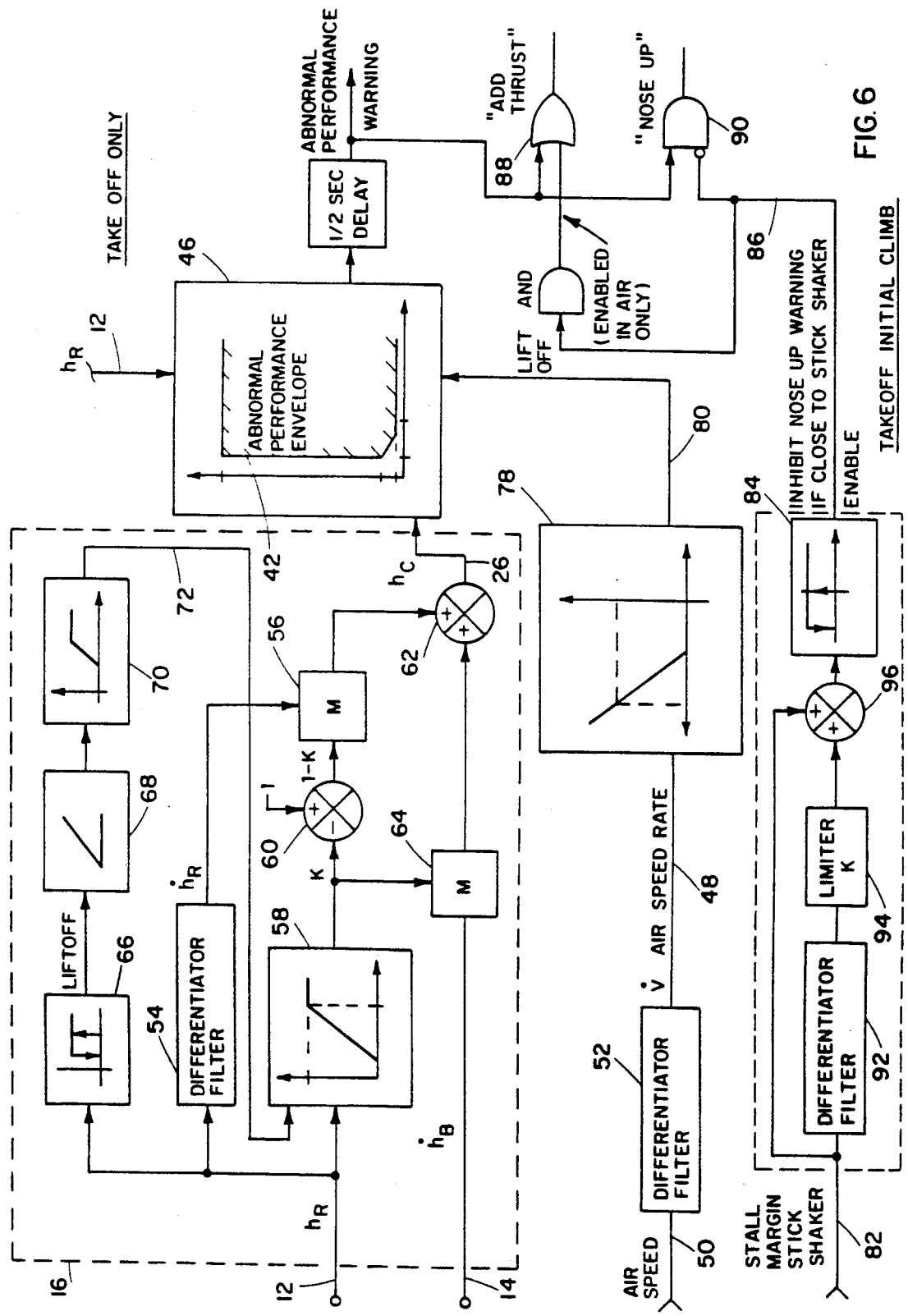
FIG. 6 is a functional block diagram of the flight path warning logic portion of the warning system of FIG. 1 used during take off.

The flight path angle warning logic is represented by a logic block 46 of FIG. 1 the details of which are shown in FIG. 6. Inputs to the logic block 46 include radio altitude on line 12, computed altitude rate on line 26 and airspeed rate on line 48. Airspeed V is obtained from data source 10 and applied over line 50 to a differentiator circuit 52.

Referring to FIG. 6 the computed altitude circuit 16 produces the computed altitude rate signal $h_C$ on line 26 by blending the barometric rate signal $h_B$ with a radio rate signal $h_R$ below a predetermined radio altitude $h_{RMAX}$. The radio altitude signal is differentiated by a differentiator circuit 54 and applied to a first multiplier circuit 56. A multiplier K having values from 0 to 1.0 as a function of radio altitude is produced by a function generator circuit 58. The value 1-K produced by a summing junction 60 is also applied to the first multiplier 56 resulting in the value (1-K) $h_R$ on a plus terminal of a summing junction 62. A second input to the summing junction 62 is the quantity K $h_B$ produced by a second multiplier circuit 64. The second multiplier circuit 64 receives the barometric rate signal over line 14 and the multiplier K from function generator circuit 58. In operation the circuit 16 will produce a computed altitude rate signal $h_C$ that at $h_{RMIN}$ and below is equal to radio altitude rate and at $h_{RMAX}$ is equal to barometric altitude rate. The computed altitude rate $h_C$ is proportional to the flight path angle $\gamma$ and serves as an approximation of the flight path angle at any given airspeed. Thus, the computed altitude rate signal $h_C$ is applied to the logic circuit 46 and serves as the $\gamma$ input to the warning envelope. Alternatively, the $h_C$ signal could be divided by the airspeed to obtain the $\gamma$ signal as is done in FIG. 8.

In addition, the computed altitude circuit 16 includes a detector circuit 66 responsive to radio altitude on line 12 to start a timer circuit 68 at lift off. The timer 68 inputs to a limiter circuit 70 that outputs a signal over a line 72 to the function generator circuit 58 that has the effect of making the value of K equal to 1.0 a predetermined time after the aircraft lifts off the runway.

As discussed above the warning curve of FIG. 4 is shifted to the left as a function of a decreasing rate of airspeed. A function generator circuit 78 in FIG. 6 responds to the airspeed rate signal on line 48 and serves by means of line 80 to bias the output of logic circuit 46 to provide a warning at greater flight path angles as a function of increasing negative airspeed rate.

With respect to the flight path angle warning, once a warning has been generated by the circuit 46 indicating that the aircraft may have an unsafe flight path angle, it is considered desirable to provide the air crew with guidance as to what action will tend to maximize the safety of the aircraft. Logic which can form a portion of the warning logic 28 of FIG. 1 is shown in FIG. 6. A stall margin signal $\alpha - \alpha_s$ from the signal source 10 is applied over a line 82 to a comparator circuit 84. If the stall margin signal indicates that the aircraft's angle of attack $\alpha$ is within a predetermined amount of the stick shaker angle of attack $\alpha_s$, the comparator 84 will apply a logic signal over a line 86 to an OR gate 88. A positive logic output from gate 88 will cause an aural warning such as "ADD THRUST" to be generated by the warning logic 28. The flight path logic 46 will put out a signal suggesting that the pitch attitude or flight path angle of the aircraft is too low. Normally the preferred aural warning will be "NOSE UP" or "PITCH UP" to indicate that the aircraft pitch attitude should be increased due the proximity to the ground. However, if the stall margin logic signal on line 86 indicates that the aircraft attitude is already close to stall, a "PITCH UP" type advisory may be inappropriate. Therefore, an AND gate 90 serves to inhibit the "PITCH UP" warning when the aircraft is approaching stall. In the preferred embodiment of the invention, the "ADD THRUST" advisory will always be generated since added thrust should always be considered by the aircrew when in difficulty close to the ground.

Figure 7:
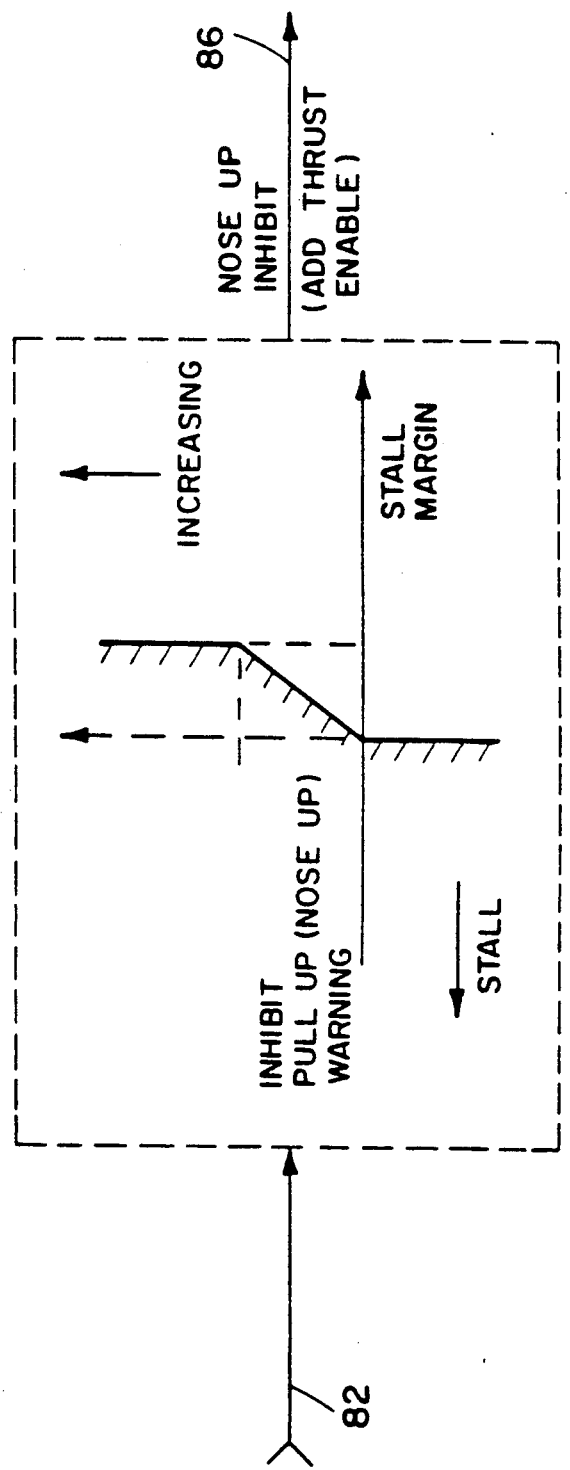
FIG. 7 is a functional illustration of the operation of the stall margin portion of the logic of FIG. 6.

Note that the circuit of FIG. 6 includes a circuit 92, a limiter 94 and a summing junction 96 to provide a stall margin rate lead term to the comparator 84. This will speed the response of the circuit 84 if the rate of increase of angle of attack should indicate a rapid pitch up of the aircraft. Operation of this circuit is illustrated by FIG. 7.

Figure 8:
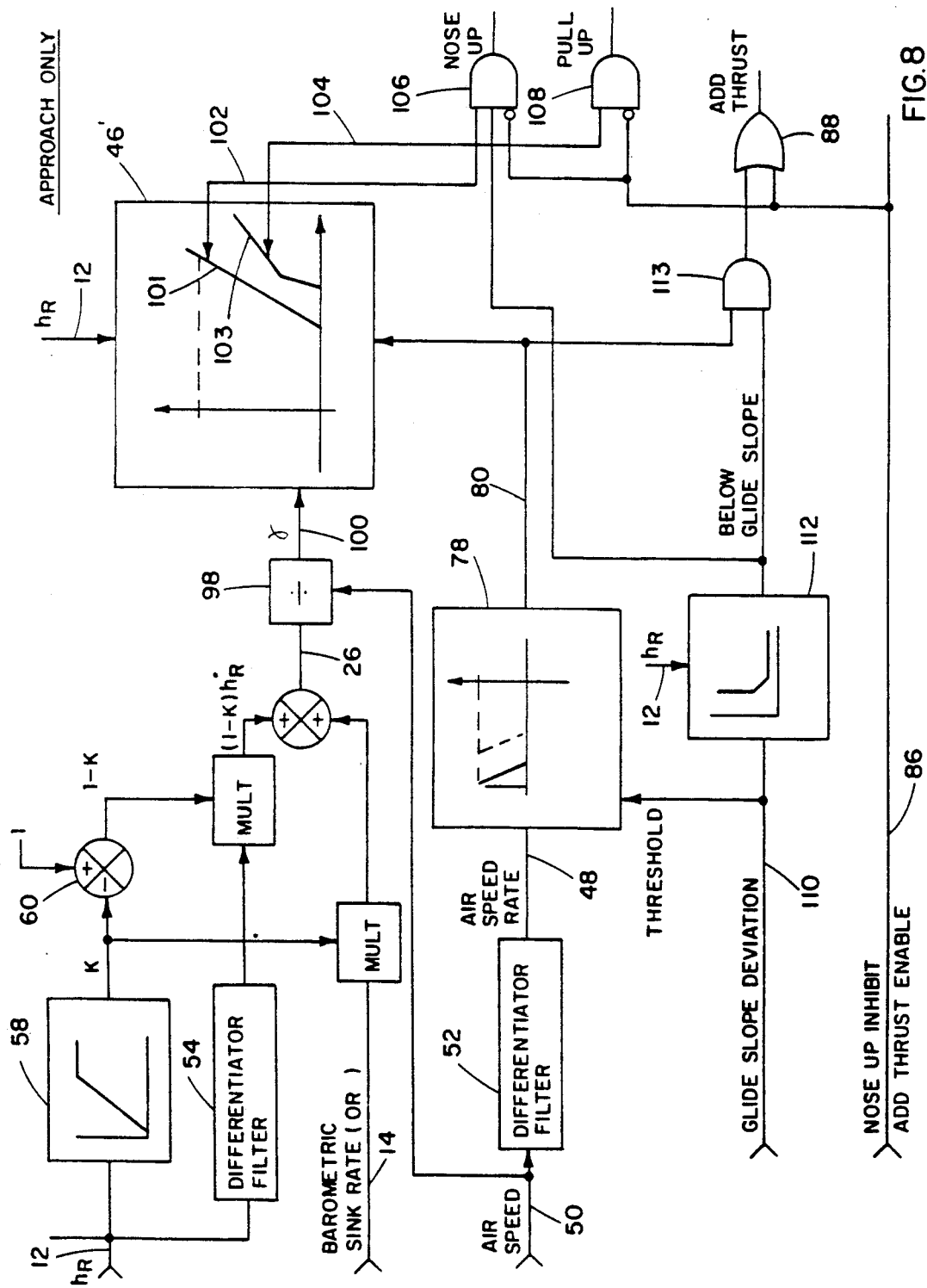
FIG. 8 is a functional block diagram of the flight path warning logic portion of the warning system of FIG. 1 used during approach.

Flight path logic 46 for use when the aircraft is on approach is illustrated in FIG. 8. When on approach the function generator 46 of FIG. 1 will operate somewhat differently from the function generator of FIG. 6 illustrated by the warning envelope of FIG. 4. Therefore, the function generator of FIG. 8 will be indicated by 46'. Flight path angle $\alpha$ which is defined as the angle that the direction of travel of the aircraft makes with the horizon, can be approximated by vertical speed such as $h_B$ or $h_C$. Computed altitude rate was used in the circuit of FIG. 6. A more accurate approximation of flight path is vertical speed divided by airspeed V. This approach is illustrated in FIG. 8 where a divider circuit 98 divides the computed altitude rate on line 26 by the airspeed on line 50. This provides a flight path angle input over line 100 to the warning envelope function generator 46'.

Since the logic of FIG. 8 is used when the aircraft is on approach the normal flight path angle will be negative. The warning envelope shown in 46' of FIG. 8 will provide a first warning initiate signal on line 102 and a second on line 104 when flight path exceeds a second amount. The first signal on line 102 applied to an AND gate 106 will cause a "NOSE UP" or "PITCH UP" aural warning. As described in connection with FIG. 6 the approaching stall margin signal on line 86 can inhibit the "PITCH UP" aural warning via AND gate 106. A pull up warning on an AND gate 108 can also be inhibited by a logic signal on line 86.

A glide slope signal G/S input from the signal source 10 of FIG. 1 on a line 110 can provide additional warning logic. This signal, input through a function generator circuit 112, can be used to inhibit the output of gate 106 when the aircraft is not below the glide slope criteria of function generator 112. The glide slope signal on line 110 can also be used to modify the bias applied by the function generator 78 to the warning envelope 46' over line 80.

An additional "ADD THRUST" warning can be generated by the OR gate 88 when an AND gate 113 is enabled by the airspeed rate signal on line 80 and the below glide slope signal from function generator 112.

The use of the logic of FIG. 6 or FIG. 8 for flight path warning depends on the phase of flight. If the aircraft is in a take-off or go around phase of operation, the circuit of FIG. 6 is used. If the aircraft is in an approach phase, the circuit of FIG. 8 is used. In the preferred embodiment a take-off logic circuit 114 is used to select the appropriate flight path warning circuit. Logic for such a circuit is disclosed in U.S. Pat. Nos. 3,947,810 and 4,319,218. A phase of flight signal is transmitted from the takeoff logic 114 over a line 116 to circuit 46.

Under certain circumstances it may be desirable to give a warning of potentially insufficient angle of attack. The criteria for such a warning is illustrated in FIG. 5. During take off, once the aircraft has rotated to a predetermined angle of attack, for example 2°, any decrease in angle of attack will result in a warning. Logic for generating such a warning is indicated by a block 118 in FIG. 1. Duration of this warning mode can be a function of time from lift off or radio altitude or barometric altitude.

An alternative system to the system illustrated in FIG. 6 for providing an abnormal performance warning during the take-off phase of flight is illustrated in FIG. 9. The warnings provided by the system illustrated in FIG. 9 are similar to those provided by the system of FIG. 6; however, the logic used to generate the warnings is somewhat different. The system of FIG. 9 utilizes a logic block 146 which is similar to the logic block 46 and is illustrated in greater detail in FIG. 10. As in the case of the logic circuit 46, the logic circuit 146 provides a warning in the event of abnormal flight conditions, and generates a warning in the event of an abnormal climb gradient; however, the warning envelope is shifted to provide the warning earlier in the event of decreasing airspeed rates, as opposed to increasing negative altitude rates as in the case of the logic circuit 46 of FIG. 6.

Referring to FIG. 9, the logic circuit 146 receives the radio altitude signal from the line 12, a signal representative of the flight path angle on the line 100 and a bias signal. The bias signal is generated by a function generator circuit 202 that receives the airspeed rate signal on line 48 and operates on the airspeed rate signal to produce the bias signal which is applied to the logic circuit 146 via a hold circuit 204. A logic circuit 206 compares the airspeed rate signal with the radio altitude signal and generates a thrust alert signal in the event of an abnormally high decreasing airspeed rate.

In operation, the system of FIG. 9 provides two alerts, one related to the flight path angle and the other to thrust. The flight path angle warning envelope is based on the envelope illustrated in FIG. 10. The basic warning envelope, as illustrated by line 42', is based on a one engine inoperative worst case climb gate gradient, which in the illustrated example is +1.25°. Thus, if the climb angle is less than +1.25°, the system assumes a performance problem exists and the circuit 146 issues a γ alert.

In addition, during the initial take-off phase, it is assumed that the aircraft will accelerate smoothly to its final climb speed. This assumption is utilized to detect a performance problem by monitoring the rate of change of airspeed via the analog function generator 202. The function generator 202 monitors the rate of change of airspeed, and if a sufficiently high decreasing rate of change of air-speed is detected, the climb gradient at which the alert is given is advanced. For example, in the illustrated embodiment the advance begins at a negative one-half knot per second deceleration and provides an advance in the flight path angle at which the alert is generated at increasing negative airspeed rates. In the illustrated example, the angle required to generate an alert is increased by 1 degree for a 2 knots per second deceleration and by 3 degrees for a 3 knot per second deceleration, as is illustrated by the line 44' of FIG. 10. This provides an early alert if the aircraft experiences a rapidly decaying airspeed. The bias from the circuit 202 is held by the circuit 204 for a short period of time, for example, 3 seconds, to maintain the γ alert active for that time. In order to counteract the possibility of a wrong reaction to the alert, that is, a nose-down reaction when a nose-up reaction is called for.

The thrust alert is generated by the circuit 206 in the event of an excessive deceleration. The circuit 206 monitors the radio altitude and the airspeed rate and generates a thrust alert in the event of an excessive deceleration below predetermined altitude as illustrated by the shaded area of the graph within the logic diagram 206.

The circuit illustrated in FIG. 9 is intended to be operative only during the take-off mode, and consequently, a gate 208 is provided with a lift-off signal, for example, from the detector 66 (FIG. 6) and a take-off mode signal which is a standard signal obtainable from a ground proximity warning system. The output of the AND gate 208 is connected to a pair of AND gates 210 and 212 and serves to enable those gates only when the aircraft is taking off. The output of the gate 210 is connected to an AND gate 214 which passes the γ alert signal to a delay circuit 216 when the gate 214 is not inhibited by the stick shaker signal on line 86. The delay 216 delays the alert message by approximately 0.8 second to reduce nuisance warnings. If the alert signal from the circuit 146 persists beyond 0.8 second, the output of the delay circuit 216 is used to trigger an alert message, such as, for example, "PULL UP".

The thrust alert signal is applied to an OR gate 218 whose output is coupled to a delay circuit 220 which is similar to the delay circuit 216, via the AND gate 212. Thus, if the aircraft is in the take-off mode, and the thrust alert signal from the circuit 206 persists for a longer time than the delay period provided by the delay 220, a thrust alert message, such as, for example, "ADD THRUST" is generated. In addition, if the aircraft is near a stall condition, the signal from the stall margin stick shaker applied to the gate 218 on line 86 will also cause the thrust alert message to be issued. Simultaneously, the stall margin stick shaker signal will inhibit the pull up signal from being generated.

In the approach mode, the alert generating logic is altered, and consequently, the alert logic will be captioned by the reference numeral 146' in FIG. 11. The warning envelopes illustrated in the logic block 146' in FIG. 11 are illustrated in greater detail in the envelopes 101' and 103' in FIG. 10.

In designing the warning envelopes, a nominal flight path angle profile versus altitude is assumed. A typical stable approach averages a flight path angle of −3°. Allowance for maneuvering results in a flight path angle alert warning envelope such as the envelope 101' which starts at a flight path angle of −4° at 5° feet and increases to −9° at 700 feet. If the flight path angle exceeds this profile, an advisory alert, such as the "SINK RATE" alert is given. The envelope represented by the profile 103' is shifted −2° from the profile 101'. The profile 103' starts at a flight path angle of −6° at 0 feet and increases to −9° at approximately 400 feet. If the profile 103' is penetrated, a hard γ alert message such as "PULL UP" is generated.

The γ alert and γ warning signals from the logic circuitry 146' are applied to a pair of AND gates 230 and 232 (FIG. 11), respectively, the latter signal being applied to the gate 232 via an OR gate 234. The gates 230 and 232 serve to prevent the generation of a warning except when the aircraft is in the approach mode. Thus, the gates 230 and 232 are inhibited by an AND gate 236 unless the aircraft has lifted off and is in the approach mode. The lift-off signal applied to gate 236 may be obtained from the detector 66 (FIG. 6) and the approach mode signal obtained from a standard ground proximity warning system. A pair of delay circuits 238 and 240 delay the generation of the "SINK RATE" and "PULL UP" signals to reduce nuisance warnings. In the embodiment illustrated, the delay 238 provides a delay of 0.9 second, while the delay 240 provides a delay of 1.4 seconds. An AND gate 243 monitors the Y alert signal as well as the below glide slope signal which may be obtained from the standard ground proximity warning system or from the logic block 112 (FIG. 8). This causes the γ alert message (PULL UP) to be generated instead of the SINK RATE message if the warning envelope 101' is penetrated and the aircraft is below the glide slope by a predetermined amount.

As in the case of the system illustrated in FIG. 8, the warning envelopes used by the logic 146' to generate the various alerts are shifted as a function in the changes of the airspeed of the aircraft. However, instead of shifting the envelopes as a function of airspeed rate modified by the glide slope deviation signal, the system illustrated in FIG. 11 compares the actual airspeed rate of the aircraft with a normal deceleration profile and alters the warning envelopes as a function of a departure of the airspeed rate of the aircraft from the normal deceleration profile. This is accomplished by a summing junction 242, a function generator 244 and a scaling circuit 246. The summing junction 242 receives the airspeed rate signal, for example, from the output on line 48 from the differentiator filter 52 (FIG. 8) and subtracts it from the normal deceleration profile. The normal deceleration profile is generated by the system illustrated in FIG. 12, and will be discussed in a subsequent portion of the specification.

The output of the summing junction 242 is a signal representative of the deviation of the airspeed rate of the aircraft from the normal deceleration profile. The deviation signal from the summing junction 242 is applied to the function generator 244 which provides a signal representative of the amount of $\gamma$ bias, or shift in the warning envelopes, required as a function of deviation from the deceleration profile. In the present embodiment, the function generator 244 shifts the Y warning envelope 103' by 2 degrees for each knot per second of deceleration that the airspeed rate deviates from the normal deceleration profile. Thus, for excessive deceleration rates, the warning is given sooner. Because the envelope 101' is positioned nearer the nominal flight path angle of 3 degrees than is the envelope 103', shifting the envelope 101' by an amount equal to the shift of the envelope 103' would make the system too sensitive and result in nuisance warnings. Consequently, the scaling function 246 reduces the amount of shift of the envelope 101' by one-half, thus resulting in a shift of only 1 degree for each knot per second of excessive deceleration beyond the normal deceleration profile.

In addition, the system monitors the output of the summing junction 242 and generates a warning if the deceleration of the aircraft exceeds the normal deceleration profile by a predetermined amount regardless of other flight conditions. This is accomplished by a logic circuit 248, an OR gate 250, an AND gate 252 and a delay circuit 254. In the illustrated embodiment, the excessive deceleration signal from the summing junction 242 is monitored by the logic circuit 248 to generate a thrust alert signal in the event that the deceleration deviates from the normal deceleration profile by a predetermined amount, for example, 3 knots per second. The OR gate 250 responds to the thrust alert signal and applies a signal to the AND gate 252. If the AND gate 252 is enabled by the AND gate 236 in the approach mode, the AND gate 252 responds to the signal from the OR gate 250 and applies a signal to the delay 254 which provides a delay on the order of approximately 0.9 second to reduce nuisance warnings. If the duration of the signal from the gate 252 exceeds the delay time introduced by the circuit 254, a warning message such as "ADD THRUST" is generated. In addition, an $\alpha$ inhibit signal on the line 86 of the OR gate 250 will generate the ADD THRUST message as it does in the take-off mode system illustrated in FIG. 9. In addition, the system illustrated in FIG. 11 can be used with a standard ground proximity warning system to generate a glide slope alert in the event that the aircraft drops below the glide slope beam by a predetermined amount during the approach phase.

Figure 12:
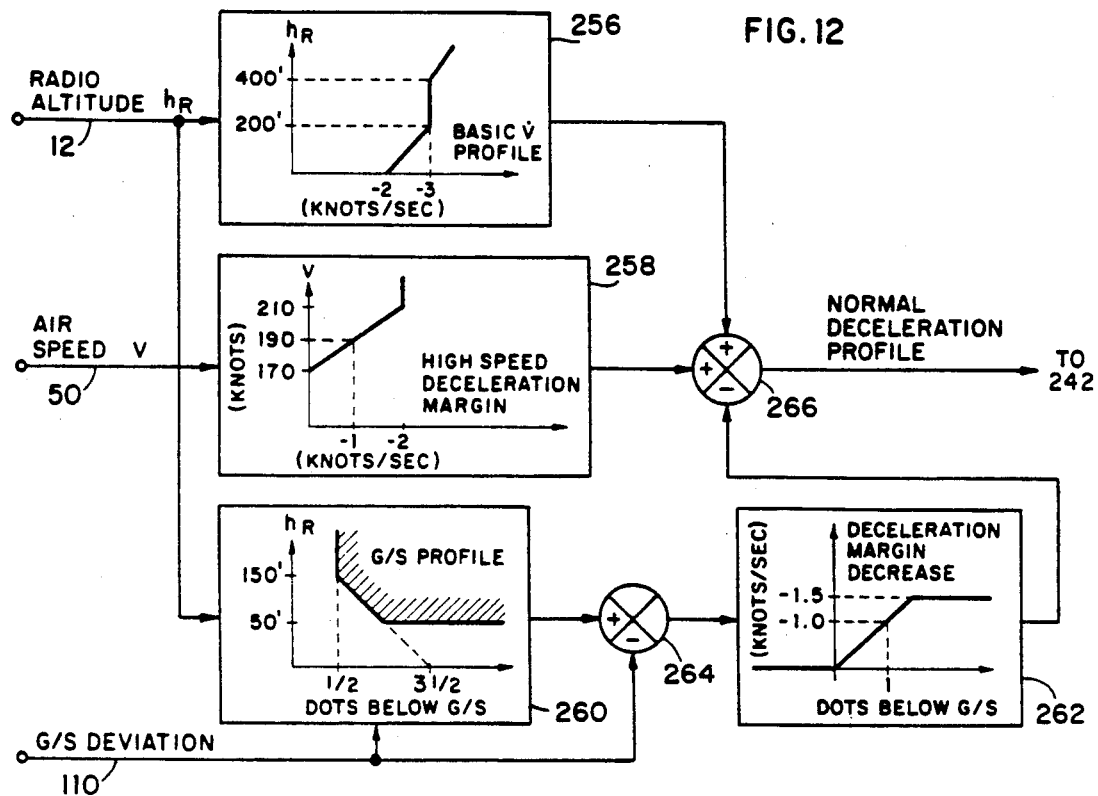
FIG. 12 is a functional block diagram of the normal deceleration profile generating logic used in conjunction with FIG. 11.
Figure 13:
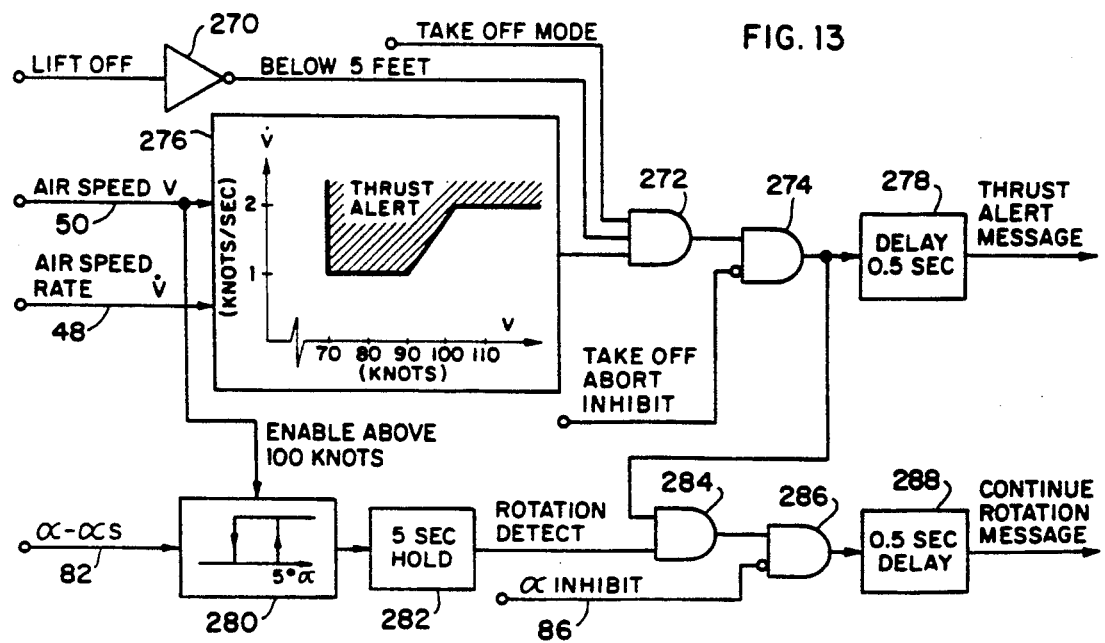
FIG. 13 is a functional block diagram of a warning system used during the take-off roll.

The circuitry for generating the normal deceleration profile signal applied to the summing junction 242 is illustrated in FIG. 12. The system utilizes existing ground proximity warning system input signals and provides the normal deceleration profile signal that is a function of altitude above ground, airspeed and glide slope deviation. This is accomplished in FIG. 12 by four function generators 256, 258, 260 and 262, and two summing junctions 264 and 266.

The function generator 256 defines the basic deceleration profile as a function of altitude above ground of the aircraft. Thus, the function generator 256 receives the radio altitude signal on the line 12 and provides an output signal representative of the maximum permissible deceleration for the altitude at which the aircraft is flying. Basically, the deceleration profile defined by the function generator 256 permits a deceleration on the order of approximately 3 knots per second at altitudes between 200 and 400 feet above ground, with a maximum permissible deceleration decreasing linearly between 200 feet above ground and touchdown to approximately 2 knots per second at touchdown. At above 400 feet the maximum permissible deceleration increases at a rate of approximately one knot per second deceleration for every 200 feet of increased altitude.

If the aircraft is approaching a landing at high speed, it may have to decelerate rapidly during the approach. Such maneuvers are not hazardous and, consequently, in order to avoid generating nuisance warnings, a high speed deceleration margin is provided by the function generator 258 which monitors the airspeed on the line 50 and increases the permitted deceleration as a function of airspeed. As is illustrated in FIG. 12, the function generator 258 permits an additional two knots per second of deceleration airspeeds in excess of 210 knots. The deceleration margin is decreased to approximately 1 knot per second at 190 knots airspeed and to approximately 0 at 170 knots.

In addition to altitude and airspeed, the glide slope deviation is monitored, and the maximum allowable deceleration is reduced when the aircraft is below the glide slope by a predetermined amount. Thus, the logic circuit 260 monitors the altitude above ground of the aircraft and the glide slope deviation received from lines 12 and 110, respectively, and generates an excessive glide slope deviation signal when the glide slope penetrates the shaded G/S profile shown in the circuit 260. When this occurs, the summing junction 264 applies the glide slope deviation signal from the line 110 to the function generator 262. The function generator 262 responds to the glide slope deviation signal to provide a deceleration margin decrease signal which is a function of the glide slope deviation whenever the aircraft is within the G/S profile. In the illustrated embodiment, the amount of permitted deceleration is reduced by approximately 1 knot per second for every dot below the glide slope up to a maximum deceleration margin decrease of 1½ knots per second. The summing junction 266 sums the basic profile received from the function generator 256 and the modifications to that profile from the function generators 258 and 262 to provide the normal deceleration profile signal.

The various alerts and warnings discussed heretofore that are provided by the system according to the invention and by a standard ground proximity warning system are generated during various phases of flight such as take off, approach, etc. However, it is also valuable for the pilot to be aware of degraded performance before take off, particularly during the take-off roll and rotation. Thus, according to another important aspect of the present invention, there is provided a system that warns the pilot of degraded performance during take off and rotation. Basically, the system monitors airspeed, airspeed rate and stall margin and advises the pilot of the appropriate action to take in the event of insufficient thrust or in the event that a wind shear is encountered after the start of rotation. The take-off mode of the system is operative during take off and when the aircraft is below five feet of altitude provided that the take off has not been aborted. The enabling functions to enable the system under these conditions are provided by an inverter 270 and a pair of AND gates 272 and 274. The lift-off signal is applied to the inverting amplifier 270 and occurs when the aircraft reaches an altitude of 5 feet above ground. Thus, in the absence of a lift-off signal, the inverting amplifier 270 provides a below 5 feet signal to the AND gate 272. The takeoff mode signal is obtained from the ground proximity warning system, and consequently the gate 272 is enabled when the aircraft is in the take off mode and is below 5 feet above the ground. The AND gate 274 is normally enabled unless inhibited by a take-off abort signal.

Once the system is enabled during the takeoff mode, the airspeed signal on line 50 and the airspeed rate signal on line 48 are monitored by logic circuitry 276. The logic circuitry 276 operates on the theory that there should not be a significant decrease in airspeed during take off, and if such a decrease occurs, it is the result of degraded performance resulting from causes either internal to the aircraft or external to the aircraft, such as windshear. Thus, the system monitors the airspeed and the airspeed rate and provides a signal to the gate 272 if the airspeed decreases by more than 1 knot per second between 70 and 90 knots of airspeed. Above 90 knots, the deceleration required to generate an alert increases until approximately 2 knots of deceleration are required to generate the thrust alert message at approximately 100 knots. The aforementioned criteria are illustrated in the shaded thrust alert envelope shown in the logic block 276. If this envelope is penetrated, and if the system is otherwise enabled, the logic circuit 276 generates a thrust alert signal which is applied to a delay circuit 278, which in the present embodiment is approximately 0.5 second, via the AND gates 272 and 274. The output of the delay circuit 278 causes a thrust alert message such as "ADD THRUST" to be generated.

If the thrust alert message is generated during rotation, the pilot may put the nose of the aircraft down if a thrust alert message is generated in an attempt to increase airspeed even though he may have sufficient airspeed to complete the take off. Consequently, the system according to the invention provides the pilot with a continue rotation message even though there may be degraded thrust, provided that the stall margin is adequate.

The continue rotation message is initiated by a rotation detector 280, a hold circuit 282, a pair of AND gates 284 and 286 and a delay circuit 288. The rotation detector 280 monitors the airspeed on the line 50 and the stall margin on the line 82 and generates a rotation signal when the airspeed exceeds 100 knots and the angle of attack of the aircraft is below the stall angle. The rotation signal is applied to the hold circuit 282 which provides a rotation detect signal for a predetermined time, for example five seconds, following the detection of rotation. The rotation detect signal is applied to the AND gate 284 and serves to enable the AND gate 284 for the hold period following the detection of rotation. If during that hold period, a thrust alert condition is detected by the logic circuit 276, the AND gate 284 is fully enabled and applies a signal to the AND gate 286. If the AND gate 286 is not inhibited by the stall margin inhibit signal on the line 86, which may have occurred as a result of a change in the stall margin during the hold period, the AND gate 286 provides a signal to the delay circuit 288. The delay circuit 288, which in the present embodiment has a delay of approximately 0.5 second, causes the continue rotation message to be generated after the delay period. Thus, the system according to the invention advises the pilot to continue the rotation when a successful rotation is possible even with degraded performance, and prevents him from executing a potentially dangerous abort maneuver.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An aircraft ground proximity warning system comprising:
   a source of radio altitude signals;
   means for generating a flight path angle signal;
   warning means responsive to said flight path angle signal for generating a warning signal when said flight path angle signal is less than a predetermined value;
   a source of barometric altitude rate signals;
   wherein said means for generating said flight path angle signal is responsive to said barometric rate signal such that said flight path angle signal is proportional to said barometric rate signal;
   a source of radio rate signals;
   computed altitude rate means for combining said barometric altitude rate signal and said radio altitude rate signal to obtain a computed altitude rate signal wherein said computed altitude rate signals include a greater proportion of said radio altitude rate signals as radio altitude decreases; and
   wherein said flight path angle signal is proportional to said computed altitude rate signal.

2. An aircraft ground proximity warning system comprising:
   a source of radio altitude signals;
   means for generating a flight path angle signal;
   warning means responsive to said flight path angle signal for generating a warning signal when said flight path angle signal is less than a predetermined value; and
   a stall margin signal source and warning logic responsive to said warning signal and said stall margin signal for generating a first warning indicating that the aircraft should pitch up except when said stall margin signal is below a predetermined value.

3. An aircraft group proximity warning system comprising:
   a source of signals representative of the flight path angle of the aircraft;
   means responsive to the flight path angle representative signals for generating a warning if the flight path angle drops below a predetermined angle;

a source of signals representative of the rate of change of airspeed wherein said warning generating means is further responsive to said airspeed rate signals for generating the warning.

4. The system recited in claim 3 wherein said warning generating means is responsive to said airspeed rate signals for altering the flight path angle at which the warning is generated as a function of airspeed rate.

5. The system recited in claim 4 wherein the flight path angle below which a warning is given is inversely proportional to the airspeed rate.

6. The system recited in claim 4 further including means responsive to the airspeed rate signal for generating a warning if the airspeed rate decreases at a predetermined rate.

7. The system recited in claim 6 further including a source of signals representative of the altitude of the aircraft above ground wherein said airspeed rate signal responsive warning means is further responsive to the altitude representative signal source for altering the airspeed rate at which the warning is generated as a function of altitude.

8. The system recited in claim 7 wherein the rate of decrease of airspeed at which the warning is generated increases as a function of altitude.

9. A system for providing the pilot of an aircraft with a warning of abnormal aircraft performance comprising:
   a source of signals representative of the airspeed of the aircraft;
   means for providing a signal representative of the normal deceleration profile of the aircraft;
   means responsive to said airspeed representative signals and said deceleration profile signal providing means for generating a warning as the deceleration of the aircraft exceeds the normal deceleration profile by a predetermined amount; and
   a source of signals representative of the deviation below the glideslope of the aircraft, wherein said deceleration profile of the aircraft is responsive to said glideslope deviation signal for defining said deceleration profile as a function of glideslope deviation.

10. A system for providing an advisory message to a pilot of an aircraft upon take off in the presence of degraded performance comprising:
   a source of signals representative of the airspeed of the aircraft;
   means responsive to the airspeed signal for providing a degraded performance message in the event that the airspeed decreases at a predetermined rate;
   means for providing a signal representative of the angle of attack of the aircraft;
   means for providing a signal representative of the stall angle of the aircraft; and
   means responsive to said airspeed signal and to the difference between the angle of attack signal and the stall angle representative signal for providing an advisory message to the pilot that the stall angle exceeds the angle of attack by a predetermined amount and the decrease in airspeed equals or exceeds said predetermined rate.

11. A system as recited in claim 10 wherein said advisory message providing means is enabled only when the airspeed of the aircraft exceeds a predetermined speed.

12. A system as recited in claim 10 wherein said system is enabled only upon take off.

13. A system as recited in claim 12 wherein said system is enabled only when the aircraft is below five feet of altitude.

14. A system for advising the pilot of an aircraft of a dangerous loss of altitude close to the ground of the type that can be caused by a wind shear condition without actually measuring wind shear, comprising:
   means for receiving a signal representative of the altitude of the aircraft;
   means for receiving a signal representative of the rate of change of altitude of the aircraft;
   means for receiving a signal representative of the rate of change of airspeed of the aircraft;
   means for receiving a signal representative of the flight path angle of the aircraft; and
   means responsive to said altitude, altitude rate, airspeed rate and flight path angle signal receiving means for generating a signal according to a predetermined relationship between the altitude, altitude rate, airspeed rate and flight path angle to advise the pilot of a loss of altitude condition.

* * * * *